United States Patent
Chang et al.

(10) Patent No.: US 8,502,922 B2
(45) Date of Patent: Aug. 6, 2013

(54) MULTIMEDIA DEVICE AND PLAY MODE DETERMINATION METHOD OF THE SAME

(75) Inventors: Hsiao-En Chang, Hsinchu (TW); Jian-De Jiang, Shaanxi (CN); Chun Wang, Shanghai (CN); Tsui-Chin Chen, Hsinchu (TW)

(73) Assignee: Novatek Microelectronics Corp., Hsinchu Science Park (TW)

( * ) Notice: Subject to any disclaimer, the term of this patent is extended or adjusted under 35 U.S.C. 154(b) by 0 days.

(21) Appl. No.: 13/279,360

(22) Filed: Oct. 24, 2011

(65) Prior Publication Data

US 2012/0140119 A1 Jun. 7, 2012

(30) Foreign Application Priority Data

Dec. 1, 2010 (TW) .............................. 99141795 A

(51) Int. Cl.
*H04N 7/01* (2006.01)
(52) U.S. Cl.
USPC ......................................................... 348/604
(58) Field of Classification Search
USPC ................ 348/604, 448, 452, 451, 441, 700, 348/456, 458, 459, 701, 620; 375/240.01, 375/240.16
See application file for complete search history.

(56) References Cited

U.S. PATENT DOCUMENTS

| 3,761,613 | A | * | 9/1973 | Limb | 375/240.12 |
|---|---|---|---|---|---|
| 5,563,651 | A | * | 10/1996 | Christopher et al. | 348/97 |
| 6,014,182 | A | * | 1/2000 | Swartz | 348/700 |
| 7,075,581 | B1 | * | 7/2006 | Ozgen et al. | 348/448 |
| 7,098,958 | B2 | * | 8/2006 | Wredenhagen et al. | 348/452 |
| 8,077,257 | B2 | * | 12/2011 | Zhou et al. | 348/441 |
| 2004/0179097 | A1 | * | 9/2004 | Ku et al. | 348/96 |
| 2010/0246953 | A1 | * | 9/2010 | Guermoud et al. | 382/168 |

* cited by examiner

*Primary Examiner* — Paulos M Natnael
(74) *Attorney, Agent, or Firm* — Rabin & Berdo, P.C.

(57) ABSTRACT

A multimedia device and a play mode determination method of the same are provided. The multimedia device includes a frame difference calculation unit, a global threshold determination unit and a play mode determination unit. The frame difference calculation unit calculates the frame difference between two continuous frames to obtain a global variation. The global threshold determination unit determines a film mode threshold corresponding to a film mode and a video mode threshold corresponding to a video mode according to a current frame of the two frames and a previous global variation, and selects a global threshold from the film mode threshold and the video mod threshold. The selected threshold is smaller than the film mode threshold. The play mode determination unit compares the global variation with the global threshold, and enables the multimedia device to enter one of the film mode and the video mode according to the comparison result.

14 Claims, 4 Drawing Sheets

MULTIMEDIA DEVICE AND PLAY MODE DETERMINATION METHOD OF THE SAME

This application claims the benefit of Taiwan application Serial No. 99141795, filed Dec. 1, 2010, the subject matter of which is incorporated herein by reference.

BACKGROUND

1. Technical Field

The disclosure relates in general to a digital processing device and a processing method, and more particularly to a multimedia device and a play mode determination method of the same.

2. Description of the Related Art

In general, a film in film format has 24 frames per second (FPS), which is called a film having 24 Hertz (Hz) frame rate. For such film to be played in the television (TV), the frame rate is required to be converted to one that can be adapted to the TV system. Such practice is called frame rate conversion (FRC).

A Telecine technology can be used for performing FRC. In practical application, the Telecine technology provides a 3:2 pull-down method for converting a film signal of 24 FPS into a signal conformed to the National Television System Committee (NTSC) specification. For example, two frames (such as "AB") can be converted into five frames (such as "AAABB"), so that the frame rate can be converted from of 24 Hz into 60 Hz. In other words, one 24 Hz frame is used for generating three 60 Hz frames, and the other 24 Hz frame is used for generating another two 60 Hz frames. Meanwhile, the frames are conformed to a cadence of "10010", wherein "1" denotes there are two continuous frames different from each other, and "0" denotes there are two continuous frames substantially the same as each other. Thus, when playing with the 3:2 pull-down method, the TV can be regarded as being in a film mode.

Another play mode of TV is video mode. When the TV enters the video mode, this indicates that to-be-displayed frames are different from each other and correspond to a cadence of "11111", which is different from the cadence of "10010" in the film mode. Thus, as regards the to-be-displayed frames suitable for different play modes (such as the film mode or video mode), if the TV cannot correctly identify a suitable play mode, the quality of the displayed frames will deteriorate. Therefore, how to identify a suitable play mode for displaying frames so as to improve the quality of displayed images has become an imminent task for the industries.

SUMMARY OF THE DISCLOSURE

The disclosure is directed to a multimedia device and a play mode determination method of the same, wherein two different thresholds are used to determine or identify a suitable play mode for the multimedia device to display continuously inputted frames, so as to improve the quality of displayed frames.

According to an aspect of the present disclosure, a multimedia device is provided. The multimedia device includes a frame difference calculation unit, a global threshold determination unit and a play mode determination unit. The frame difference calculation unit calculates a frame difference between two continuous frames to obtain a global variation. The global threshold determination unit determines a film mode threshold corresponding to a film mode and a video mode threshold corresponding to a video mode according to a current frame of the two frames and a previous global variation, and further selects a global threshold from the film mode threshold and the video mod threshold, wherein the video mode threshold selected as the global threshold is smaller than the film mode threshold. The play mode determination unit compares the global variation with the global threshold, and enables the multimedia device to enter one of the film mode and the video mode according to the comparison result.

According to an alternative aspect of the present disclosure, a play mode determination method for multimedia device is provided. The play mode determination method includes the following steps. A frame difference between two continuous frames is calculated to obtain a global variation. A film mode threshold corresponding to a film mode and a video mode threshold corresponding to a video mode are determined according to a current frame of the two frames and a previous global variation. A global threshold is selected from the film mode threshold and the video mode threshold, wherein the video mode threshold selected as the global threshold is smaller than the film mode threshold. The global variation is compared with the global threshold, so that the multimedia device enters one of the film mode and the video mode according to the comparison result.

According to another alternative aspect of the present disclosure, a play mode determination method for multimedia device is provided. The play mode determination method includes the following steps. Two continuous frames are obtained. A frame difference between two frames is calculated to obtain a global variation. Whether the two frames are two still frames is determined. When at least two still frames are detected, a video mode threshold corresponding to a video mode is used as a global threshold, wherein the video mode threshold is smaller than a film mode threshold used by the multimedia device in a film mode. When a subsequent global variation is larger than the global threshold, the multimedia device is enabled to enter the video mode.

The above and other aspects of the disclosure will become better understood with regard to the following detailed description of the preferred but non-limiting embodiment(s). The following description is made with reference to the accompanying drawings.

DETAILED DESCRIPTION OF THE DISCLOSURE

Figure 1:
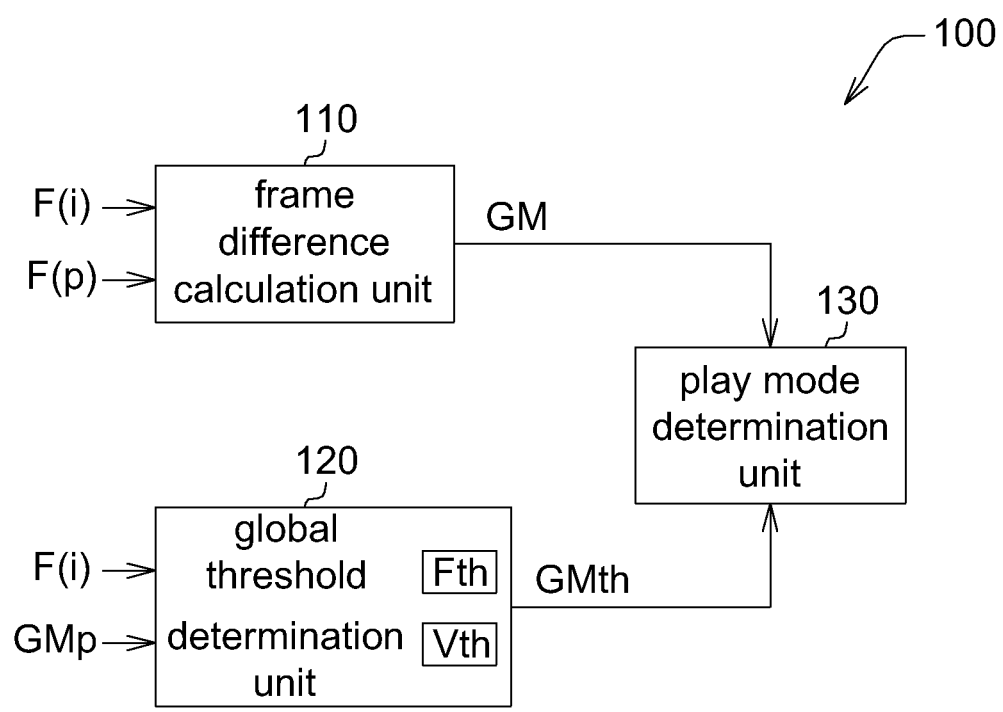
FIG. 1 shows a block diagram of a multimedia device according to an embodiment of the disclosure.

Referring to FIG. 1, a block diagram of a multimedia device according to an embodiment of the disclosure is shown. The multimedia device 100 includes a frame difference calculation unit 110, a global threshold determination unit 120, and a play mode determination unit 130. The frame difference calculation unit 110 calculates a frame difference between two continuous frames F(i) and F(p) to obtain a global variation GM. The global threshold determination unit 120 determines a film mode threshold Fth corresponding to a film mode and a video mode threshold Vth corresponding to a video mode according to a current frame F(i) of the two frames F(i) and F(p) and a previous global variation GMp. The global threshold determination unit 120 selects a global threshold GMth from the film mode threshold Fth and the video mode threshold Vth. The video mode threshold Vth selected as global threshold GMth is smaller than the film mode threshold Fth. The play mode determination unit 130 compares the global variation GM with the global threshold GMth. The play mode determination unit 130 enables the multimedia device 100 to enter one of the film mode and the video mode according to the comparison result.

According to the multimedia device disclosed in the above embodiment of the disclosure, two different thresholds are used to determine or identify a suitable play mode for the multimedia device to display continuously inputted frames. In this way, the multimedia device can enter the suitable play mode for displaying frames, so as to improve the quality of displayed frames. Embodiments of the multimedia device are disclosed below for detailed descriptions of the disclosure.

Figure 2:
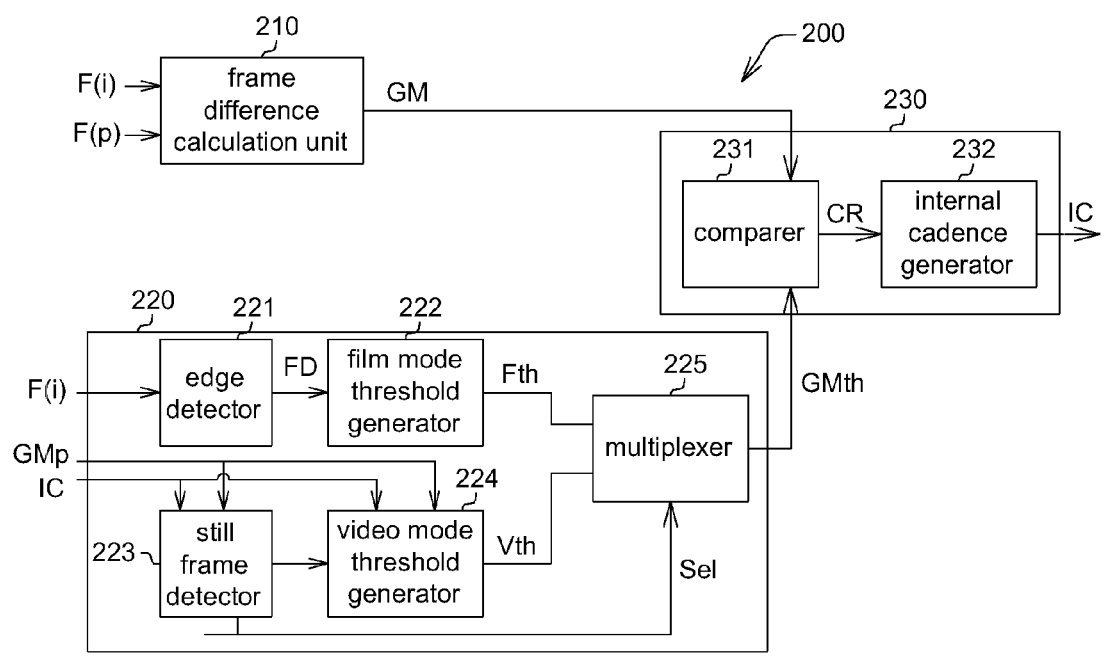
FIG. 2 shows a circuit diagram of an example of the multimedia device of FIG. 1.
Figure 3:
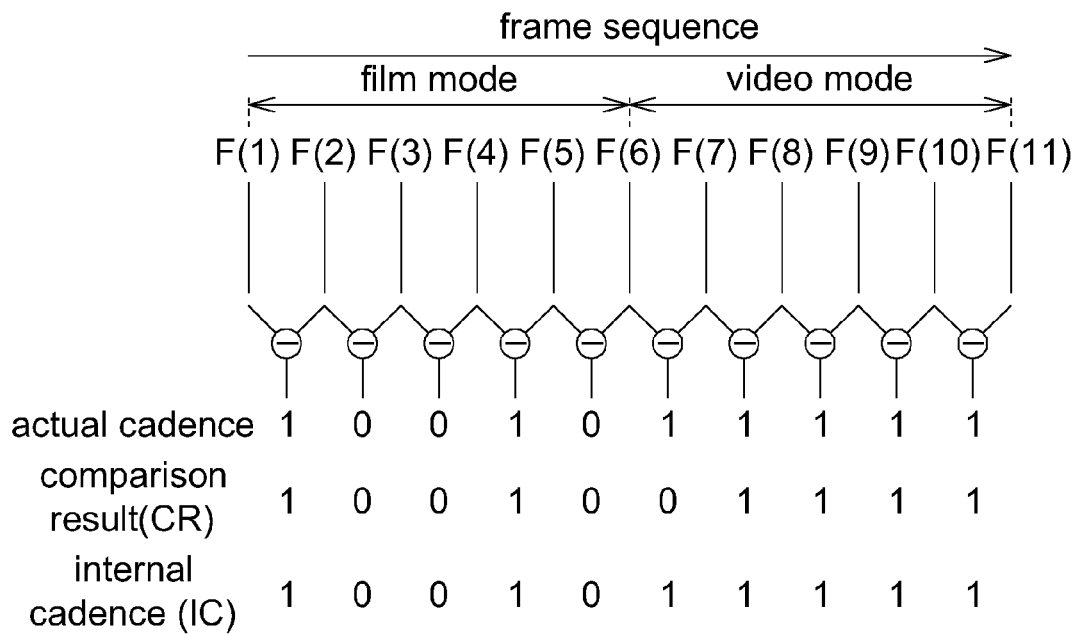
FIG. 3 shows a schematic diagram of an example of continuous multiple frames received by the multimedia device of FIG. 2 and multiple signals generated by the same.

Refer to FIG. 2 and FIG. 3. FIG. 2 shows a circuit diagram of an example of the multimedia device of FIG. 1. FIG. 3 shows a schematic diagram of an example of continuous multiple frames received by the multimedia device of FIG. 2 and multiple signals generated by the same. In FIG. 3, it is exemplified that former six frames F(1)~F(6) are film frames, and latter five frames F(7)~F(11) are video frames. The "actual cadence" column denotes the actual cadence of the frames F(1)~F(11), wherein the actual cadence of the former six frames F(1)~F(6) is "10010", and the actual cadence of the latter six frames F(6)~F(11) is "11111". The actual cadence of "1" denotes there are two continuous frames substantially different from each other, and the actual cadence of "0" denotes that there are two continuous frames substantially the same as each other.

The multimedia device 200 obtains two continuous frames F(i) and F(p) from the frames F(1)~F(11) of FIG. 3, such as frames F(1) and F(2), frames F(2) and F(3), and so on. The multimedia device 200 includes a frame difference calculation unit 210, a global threshold determination unit 220, and a play mode determination unit 230. The operation relationships between the units are disclosed below.

The play mode determination unit 230 includes a comparer 231 and an internal cadence generator 232. The comparer 231 compares the global variation GM with the global threshold GMth of the two frames F(i) and F(p). The comparison result CR obtained by the comparer 231 is illustrated in the "comparison result" column of FIG. 3, wherein, the comparison result CR of "1" denotes that the global variation GM of the two frames F(i) and F(p) is larger than the global threshold GMth, and the comparison result CR of "0" denotes that the global variation GM of the two frames F(i) and F(p) is smaller than global threshold GMth. The internal cadence generator 232 generates an internal cadence IC according to the comparison result CR of the comparer 231. The internal cadence IC, being a signal indicating that the multimedia device 200 is on one of the film mode and the video mode, indicates a current play mode of the multimedia device 200. As indicated in the "internal cadence" column of FIG. 3, the internal cadence IC of "10010" denotes that the multimedia device 200 enters the film mode, and the internal cadence IC of "11111" denotes that the multimedia device 200 enters the video mode.

The frame difference calculation unit 210 calculates the frame difference between two continuous frames F(i) and F(p) to obtain the global variation GM. In an embodiment, the frame difference calculation unit 210 can for example calculate the difference between every two corresponding pixel data of two frames F(i) and F(p), so as to obtain a sum of absolute differences (SAD) of the entire frame and uses the SAD as the global variation GM. However, the disclosure is not limited to such exemplification. Alternatively, the frame difference calculation unit 210 can also use the sum of squared differences (SSD), the mean absolute difference (MAD), the mean square error (MSB), the mean square difference (MSD) of two frames F(i) and F(p) or other types of frame difference between two frames F(i) and F(p) as the global variation GM.

The global threshold determination unit 220 determines a film mode threshold Fth corresponding to the film mode and a video mode threshold Vth corresponding to the video mode according to the current frame F(i) and a previous global variation GMp. The use of the film mode threshold Fth and the video mode threshold Vth allows the multimedia device 200 to determine a play mode suitable for the continuously inputted videos. The global threshold determination unit 220 further selects one of the film mode threshold Fth and the video mode threshold Vth as the global threshold GMth. Thus, through the use of two different thresholds, the multimedia device 200 can enter the determined play mode suitable for continuously inputted videos.

In an embodiment, the video mode threshold Vth selected as the global threshold GMth is smaller than the film mode threshold Fth. This is because a frame difference between two continuous video frames suitable for video mode is usually smaller than a frame difference between two continuous film frames suitable for film mode. Thus, as regard a multimedia device using a single threshold, it is assumed that the multimedia device in the film mode receives video frames (such as frames showing a menu). At this time, the frame difference between video frames may be smaller than the threshold of the film mode, so the multimedia device will not be able to be switched from film mode to the video mode and will instead play the video frame in the film mode. As such, the quality of the displayed frames will deteriorate accordingly. However, in the present embodiment of the disclosure, where the multimedia device 200 in the film mode receives video frames, another threshold such as the video mode threshold, which is relatively smaller, will be used to determine whether the current mode is appropriate or not. In this way, the multimedia device may determine that the current film mode is not appropriate, and change to entering the video mode for displaying video frames. Thus, the present embodiment prevents video frames from being displayed in the film mode, and improves the quality of displayed frames accordingly.

Further description is as follows. As indicated in FIG. 2, the global threshold determination unit 220 includes an edge detector 221, a film mode threshold generator 222, a still frame detector 223, a video mode threshold generator 224, and a multiplexer 225. Function and relationship of blocks are disclosed below.

The edge detector 221 obtains the structural content Fd of the current frame F(i) by way of edge detection. The structural content Fd is for example a 2D frame whose pixel data preserve structural properties of an original frame or image. In an embodiment, the edge detector 221 obtains the structural content Fd in a vertical direction of the current frame F(i)

according to a difference between data of a previous pixel and data of a next pixel for each pixel of the current frame F(i). However, the disclosure is not limited to the edge detection method exemplified above, and is applicable to other methods of edge detection.

The film mode threshold generator 222 obtains the film mode threshold Fth according to the structural content Fd of the current frame F(i). In an embodiment, the film mode threshold Fth generated by the film mode threshold generator 222 increases as the structural content Fd of the current frame F(i) increases. For example, the film mode threshold Fth can be obtained according to a formula as follows:

$$Fth=th0+VD\times th1,$$

wherein Fth denotes a film mode threshold Fth; VD denotes the sum of each pixel data of a 2D frame denoting the structural content Fd; th0 and th1 denote two predetermined parameters, which can be determined through experiment or according to different needs. The present example shows that as VD increases, Fth also increases.

The video mode threshold generator 224 obtains the video mode threshold Vth according to an internal cadence IC and the previous global variation CMp of two frames F(i) and F(p). For example, the film mode threshold Fth can be obtained according to a formula as follows:

$$Vth=Cad(1,GM)\times W,$$

wherein Vth denotes the video mode threshold Vth; Cad (1,GM) denotes the global variation GM of two frames when the internal cadence IC equals "1"; W is a weight parameter smaller than 1 and can be designed according to different needs.

The multiplexer 225 receives the film mode threshold Fth and the video mode threshold Vth, and selects one of them as the global threshold GMth. In the present embodiment of the disclosure, the multiplexer 225 can select one of the film mode threshold Fth and the video mode threshold Vth as the global threshold GMth according to a selection signal Sel of the still frame detector 223.

The still frame detector 223 detects whether two frames F(i) and F(p) are two still frames. When the still frame detector 223 detects at least two still frames, the still frame detector 223 delivers a selection signal Sel to the multiplexer 225 for enabling the global threshold determination unit 220 to select the video mode threshold Vth as the global threshold GMth.

In an embodiment, the still frame detection unit 223 can determine whether the two frames F(i) and F(p) are two still frames according to the internal cadence IC and the magnitude of the previous global variation GMp of two frames F(i) and F(p). For example, for the video frames F(6) and F(7) of FIG. 3, they correspond to an internal cadence IC of "1" denoting that the two frames F(6) and F(7) are predicted to be different frames. On the other hand, the multimedia device at this time is currently in the film mode, and uses a film mode threshold which is previously determined and relatively larger to detect still frames. The previously determined film mode threshold is for example a previous global variation of two previous frames having an internal cadence IC of "1", such as the global variation of the two frames F(4) and F(5). As such, the comparison result CR column has a value of "0" for the video frames F(6) and F(7). In such a case where the comparison result CR is "0" when the internal cadence IC is "1", the still frame detector 223 determines that the two frames F(6) and F(7) are two still frames. However, the present embodiment of the disclosure is not limited thereto, and the still frame detector 223 can determine whether the frames F(i) and F(p) are two still frames according to other methods based on the information of the internal cadence IC and two frames F(i) and F(p) or adjacent frames. When the still frame detector 223 detects that the frames F(6) and F(7) are two still frames, a selection signal Sel is delivered to the multiplexer. Or, when the still frame detector 223 detects the two still frames, the still frame detector 223 doss not deliver the selection signal Sel until the still frame detector 223 further detects other still frames. In short, any embodiments are feasible as long as the multimedia device 200 uses a relatively smaller threshold when at least two still frames are detected.

Then, for the two frames F(7) and F(8), since the global threshold determination unit 220 has already generated a relatively smaller video mode threshold Vth according to the previous global variation CMp (the global variation of the frames F(6) and F(7)) and further used the relatively smaller video mode threshold Vth as the global threshold GMth, the comparison result CR has a value of "1" for the frames F(7) and F(8). Referring to a previous internal cadence IC of "10010" in the multimedia device 200, The two frames F(7) and F(8) is supposed to have a cadence of "0". In such a case where the internal cadence IC for the two frames F(7) and F(8) is supposed to be "0" but the comparison result CR equals "1", the play mode determination unit 230 generates a new internal cadence IC, such as a cadence of "11111" as shown in FIG. 3, for enabling the multimedia device 200 to enter the video mode. Thus, in the present embodiment of the disclosure, the internal cadence IC of "11111" generated by the internal cadence generator 232 is conformed to the actual cadence of "11111" and is thus able to make the multimedia device 200 enter a suitable play mode, hence increasing the quality of displayed frames.

Figure 4:
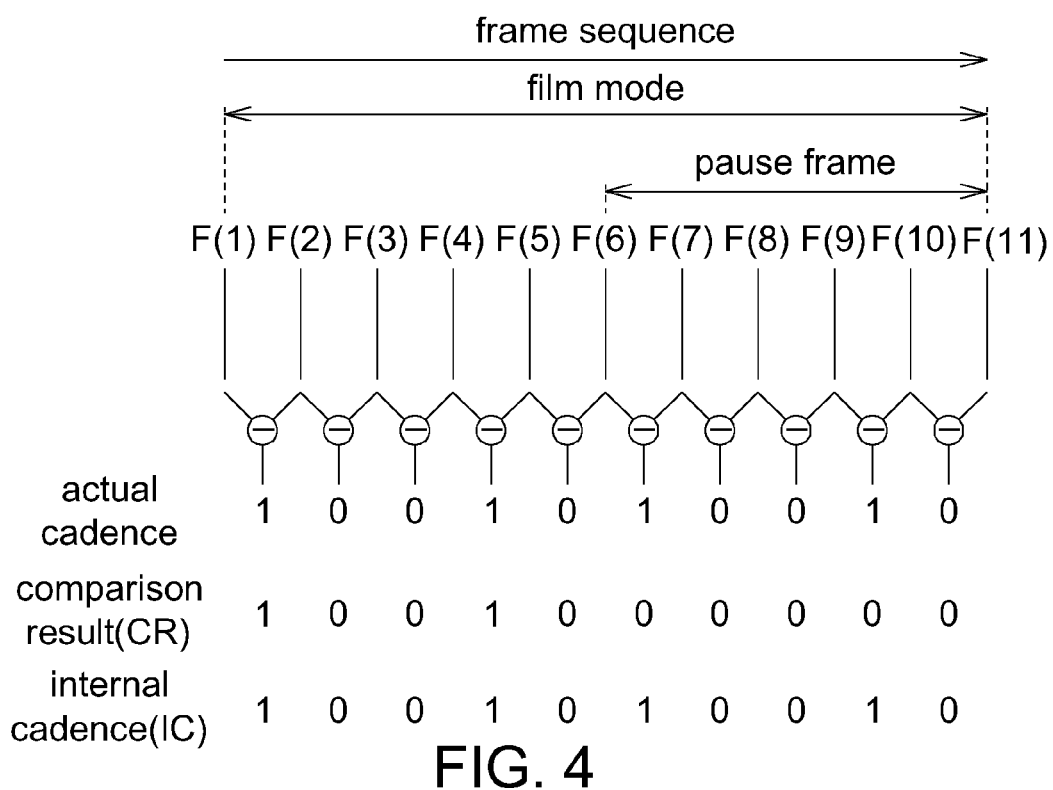
FIG. 4 shows a schematic diagram of another example of continuous multiple frames received by the multimedia device of FIG. 2 and multiple signals generated by the same.

Referring to FIG. 4, a schematic diagram of another example of continuous multiple frames received by the multimedia device of FIG. 2 and multiple signals generated by the same is shown. In the present example, the latter six frames F(6)~F(11) are exemplified as pause frames. Like the example of FIG. 3, the frames F(6) and F(7) are determined as two still frames. In this case, however, if the comparison result of the frames F(7) and F(8) equals "1", the multimedia device 200 will enter the video mode to play pause frames, and the quality of displayed frames will thus deteriorate since the video mode may not be suitable for the pause frames. In view of this, the multimedia device 200 of the present embodiment of the disclosure can predetermine a further smaller threshold for pause frames, so that the comparison result equals "0" when the internal cadence IC is of "0". Therefore, the multimedia device 200 will not display pause frames belonging to the film mode by using the video mode, so as to increase the quality of displayed frames.

Figure 5:
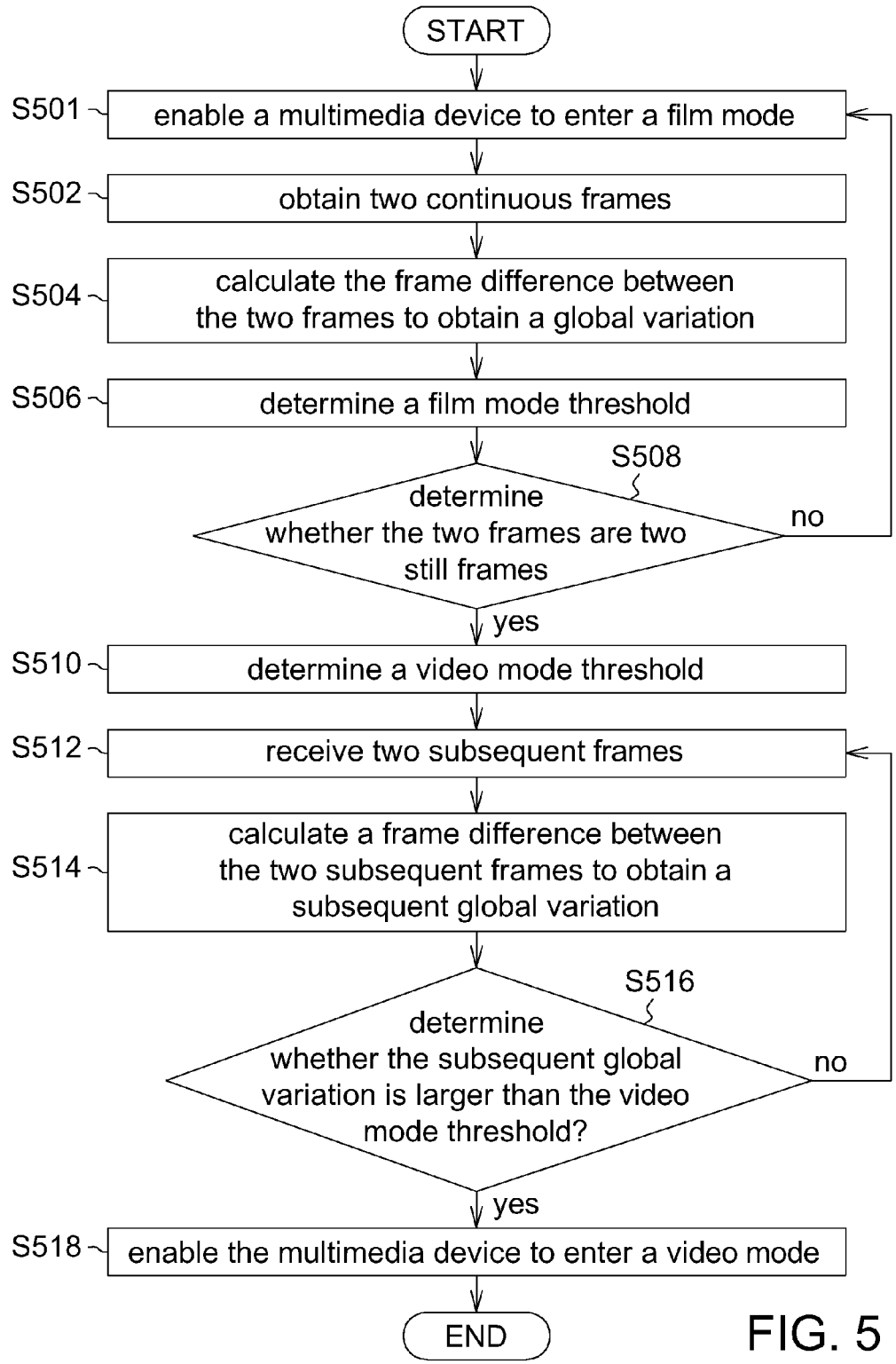
FIG. 5 shows a flowchart of an example of a play mode determination method of multimedia device according to an embodiment of the disclosure.

Referring to FIG. 5, a flowchart of an example of a play mode determination method of multimedia device according to an embodiment of the disclosure is shown. The method includes the following steps. In step S501, the multimedia device is enabled to enter the film mode. In step S502, two continuous frames are obtained. In step S504, a frame difference between the two frames is calculated to obtain a global variation. In step S506, a film mode threshold is determined, wherein the film mode threshold is suitable for a film mode of the multimedia device. In step S508, whether the two frames are two still frames is determined. If the two frames are not two still frames, then the method proceeds to the step S502. If the two frames are two still frames, then the method proceeds to step S510. In step S510, a video mode threshold suitable for the video mode is determined, wherein the video mode threshold is smaller than the film mode threshold. In step S512, two subsequent frames are received. In step S514, the frame difference between the two subsequent frames is calculated to obtain a subsequent global variation. In step S516, whether the subsequent global variation is larger than the video mode threshold is determined. If the subsequent global variation is not larger than the video mode threshold, then the method proceeds to the step S512, otherwise, the method proceeds to the step S518. In step S518, the multimedia device is enabled to enter the video mode.

In the above descriptions, the film mode is exemplified as a play mode in which a 3:2 pull-down method is performed with FRC as illustrated in the example where the internal cadence IC is "10010". However, the film mode is not limited to such exemplification, and the film mode can also be a play mode in which a 2:2 pull-down method is performed with FRC, or one where files of film format can be played by existing or future FRC technology.

According to the multimedia device and the play mode determination method of the same disclosed in the above embodiments of the disclosure, two different thresholds are used to determine or identify a suitable play mode for the multimedia device to display continuously inputted frames. In this way, the multimedia device can enter the suitable play mode for displaying frames, so as to improve the quality of displayed frames.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multimedia device, comprising:
    a frame difference calculation unit for calculating a frame difference between two continuous frames to obtain a global variation;
    a global threshold determination unit for determining a film mode threshold corresponding to a film mode and a video mode threshold corresponding to a video mode according to a current frame of the two frames and a previous global variation, and selecting a global threshold from the film mode threshold and the video mode threshold, wherein the video mode threshold selected as the global threshold is smaller than the film mode threshold; and
    a play mode determination unit for comparing the global variation with the global threshold, and generating an electrical internal cadence signal, wherein the multimedia device enters one of the film mode and the video mode according to the comparison result and the internal cadence signal.

2. The multimedia device according to claim 1, wherein the global threshold determination unit comprises:
    an edge detector for obtaining structural content of the current frame by way of edge detection; and
    a film mode threshold generator for generating the film mode threshold according to the structural content of the current frame.

3. The multimedia device according to claim 2, wherein the edge detector obtains the structural content in a vertical direction of the current frame according to a difference between the data of a previous pixel and the data of a next pixel for each pixel of the current frame.

4. The multimedia device according to claim 1, wherein the global threshold determination unit comprises:
    a video mode threshold generator for generating the video mode threshold according to the previous global variation.

5. The multimedia device according to claim 1, wherein the global threshold determination unit further comprises:
    a still frame detector for detecting whether the two frames are two still frames, and enabling the global threshold determination unit to select the video mode threshold as the global threshold when at least two still frames are detected.

6. The multimedia device according to claim 5, wherein the still frame detector determines whether the two frames are the two still frames according to the internal cadence signal of the multimedia device and the magnitude of the previous global variation of the two frames, and the internal cadence signal indicates that the multimedia device is in one of the film mode and the video mode.

7. A play mode determination method of a multimedia device, comprising:
    calculating a frame difference between two continuous frames to obtain a global variation;
    determining a film mode threshold corresponding to a film mode and a video mode threshold corresponding to a video mode according to a current frame of the two frames and a previous global variation;
    selecting a global threshold from the film mode threshold and the video mode threshold, wherein the video mode threshold selected as the global threshold is smaller than the film mode threshold; and
    comparing the global variation with the global threshold and generating an internal cadence signal, wherein the multimedia device enters one of the film mode and the video mode according to the comparison result and the internal cadence signal.

8. The play mode determination method according to claim 7, wherein the step of generating the film mode threshold comprises:
    obtaining structural content of the current frame by way of edge detection; and
    generating the film mode threshold according to the structural content of the current frame.

9. The play mode determination method according to claim 8, wherein the step of obtaining the film mode threshold according to the structural content of the current frame comprises:
    obtaining the structural content in a vertical direction of the current frame according to a difference between the data of a previous pixel and the data of a next pixel for each pixel of the current frame.

10. The play mode determination method according to claim 8, wherein the film mode threshold increases as the structural content of the current frame increases.

11. The play mode determination method according to claim 8, wherein the step of generating the video mode threshold comprises:
    generating the video mode threshold according to the previous global variation.

12. The play mode determination method according to claim 7, wherein the step of selecting the global threshold comprises:
    detecting whether the two frames are two still frames; and
    selecting the video mode threshold as the global threshold when at least two still frames are detected.

13. The play mode determination method according to claim 12, wherein in the step of determining whether the two frames are the two still frames, the determination is made according to the internal cadence signal of the multimedia device and the magnitude of the previous global variation of the two frames, and the internal cadence signal indicates that the multimedia device is in one of the film mode and the video mode.

14. The play mode determination method according to claim 12, wherein, after at least two still frames are detected, the multimedia device enters the video mode when the video mode threshold is selected as the global threshold and the global variation is determined as being larger than the global threshold.

* * * * *